US008457892B2

(12) United States Patent
Aso et al.

(10) Patent No.: US 8,457,892 B2
(45) Date of Patent: Jun. 4, 2013

(54) OWN-VEHICLE-PATH DETERMINING METHOD AND OWN-VEHICLE-PATH DETERMINING APPARATUS

(75) Inventors: Kazuaki Aso, Narashino (JP); Toshiki Kindo, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1041 days.

(21) Appl. No.: 12/083,239

(22) PCT Filed: Mar. 1, 2007

(86) PCT No.: PCT/JP2007/053955
§ 371 (c)(1),
(2), (4) Date: Apr. 8, 2008

(87) PCT Pub. No.: WO2007/102405
PCT Pub. Date: Sep. 13, 2007

(65) Prior Publication Data
US 2009/0012703 A1   Jan. 8, 2009

(30) Foreign Application Priority Data
Mar. 1, 2006   (JP) .................. 2006-055441

(51) Int. Cl.
*G01C 21/00* (2006.01)
(52) U.S. Cl.
USPC ............ 701/519; 701/400; 701/422; 701/439
(58) Field of Classification Search
USPC .................. 701/400, 422, 439, 519
See application file for complete search history.

(56) References Cited

U.S. PATENT DOCUMENTS

| 5,521,826 | A | * | 5/1996 | Matsumoto | 701/208 |
|---|---|---|---|---|---|
| 5,572,428 | A | | 11/1996 | Ishida et al. | |
| 6,070,118 | A | | 5/2000 | Ohta et al. | |
| 6,144,915 | A | | 11/2000 | Shiomi et al. | |
| 6,169,495 | B1 | | 1/2001 | Koike | |
| 6,253,129 | B1 | * | 6/2001 | Jenkins et al. | 701/29 |
| 6,594,577 | B2 | * | 7/2003 | Nakajima et al. | 701/117 |
| 6,675,094 | B2 | * | 1/2004 | Russell et al. | 701/301 |

(Continued)

FOREIGN PATENT DOCUMENTS

| JP | A-02-028800 | 1/1990 |
|---|---|---|
| JP | A-06-215300 | 8/1994 |

(Continued)

OTHER PUBLICATIONS

Broadhurst et al., "Monte Carlo Road Safety Reasoning," IEEE Intelligent Vehicle Symposium (IV2005), IEEE, Jun. 2005.

(Continued)

*Primary Examiner* — Thomas Tarcza
*Assistant Examiner* — Adam Tissot
(74) *Attorney, Agent, or Firm* — Oliff & Berridge, PLC

(57) ABSTRACT

An own-vehicle-path determining method includes calculating a first evaluation value of each of plural predicted own-vehicle-path candidates, calculating a second evaluation value of each of the plural own-vehicle-path candidates, selecting own-vehicle-path candidates with high first evaluation values from the plural own-vehicle-path candidates, selecting own-vehicle-path candidates with high second evaluation values as appropriate own-vehicle-path candidates from the selected own-vehicle-path candidates, and selecting any one of the appropriate own-vehicle-path candidates as an own-vehicle path.

30 Claims, 11 Drawing Sheets

U.S. PATENT DOCUMENTS

| | | |
|---|---|---|
| 6,926,374 B2 | 8/2005 | Dudeck et al. |
| 7,054,742 B2 * | 5/2006 | Khavakh et al. ............. 701/209 |
| 7,579,942 B2 * | 8/2009 | Kalik ........................... 340/435 |
| 2002/0123838 A1 | 9/2002 | Nakajima et al. |
| 2004/0122587 A1 | 6/2004 | Kanemitsu |
| 2006/0247852 A1 * | 11/2006 | Kortge et al. ................. 701/209 |
| 2009/0076702 A1 * | 3/2009 | Arbitmann et al. ............. 701/96 |

FOREIGN PATENT DOCUMENTS

| | | |
|---|---|---|
| JP | A-07-225612 | 8/1995 |
| JP | A-08-016240 | 1/1996 |
| JP | A-09-303544 | 11/1997 |
| JP | B2-2799375 | 7/1998 |
| JP | A-10-207504 | 8/1998 |
| JP | A-11-126294 | 5/1999 |
| JP | A-2002-260155 | 9/2002 |
| JP | A-2003-123185 | 4/2003 |
| JP | A-2004-504216 | 2/2004 |
| JP | A-2004-199286 | 7/2004 |
| JP | A-2004-199389 | 7/2004 |
| JP | A-2004-212160 | 7/2004 |
| JP | A-2004-257852 | 9/2004 |
| JP | A-2005-043068 | 2/2005 |
| JP | A-2005-098714 | 4/2005 |
| WO | WO 00/40929 A1 | 7/2000 |
| WO | WO 03/025507 A2 | 3/2003 |
| WO | WO 03/096068 A1 | 11/2003 |

OTHER PUBLICATIONS

Extended European Search Report mailed Mar. 4, 2010 in European Application No. 07 71 5118.

Notice of Rejection for Japanese Patent Application No. 2008-503814; mailed Aug. 20, 2010 (with translation).

* cited by examiner

OWN-VEHICLE-PATH DETERMINING METHOD AND OWN-VEHICLE-PATH DETERMINING APPARATUS

TECHNICAL FIELD

The present invention relates to own-vehicle-path determining methods and own-vehicle-path determining apparatuses which determine one own-vehicle-path candidate as an optimal drivable path from plural predicted own-vehicle-path candidates, and more particularly, to own-vehicle-path determining methods and own-vehicle-path determining apparatuses suitable for automatic driving of an own vehicle.

BACKGROUND ART

In recent years, various attempts have been made to realize automatic driving of automobiles. For the realization of the automatic driving of automobiles, it is important to correctly detect objects around the vehicle such as vehicles, pedestrians, and obstacles, and to avoid dangers based on the result of detection while the vehicle is running. As a technique for detecting surrounding objects with high accuracy, object-detecting techniques utilizing various types of sensors and radars are known.

On the other hand, as a technique for avoiding dangers during driving, techniques for a system of plural objects and an own vehicle are known, which use information about position and speed of the own vehicle and information about positions and speed of plural objects other than the own vehicle to generate expected paths of objects including the own vehicle, and predict a possibility of collision of two objects among the objects constituting the system (see, for example, Nonpatent Literature 1). This technique predicts possible paths of all the objects constituting the system according to operation series of same framework based on a concept of probability, and outputs the predicted paths. Thereafter, a path, according to which the safest situation is realized for the entire system including the own vehicle, is found and output based on the predicted results.

Nonpatent Literature 1: Broadhurst, S. Baker, and T. Kanade, "Monte Carlo Road Safety Reasoning", IEEE Intelligent Vehicle Symposium (IV2005), IEEE, (2005 June)

DISCLOSURE OF INVENTION

Problem to be Solved by the Invention

However, the path found through the prediction by the technique described in Nonpatent Literature 1 is often unreasonable because this technique focuses on predicting a path which is safe for all the objects constituting the system. For example, on a highway, if a vehicle is running ahead of an own vehicle at a lower speed on the same driving lane, a driver of the own vehicle may think he/she can pass. However, since it is safer to simply follow the other slower vehicle, a path following the other vehicle is selected as a safe path based on the prediction. Then, sometimes the arrival to the destination is delayed. In brief, though such techniques may realize an extremely high driving safety, its driving efficiency can be extremely low.

The present invention is made in view of the above, and an object of the present invention is to provide an own-vehicle-path determining method and an own-vehicle-path determining apparatus which can determine an appropriate own-vehicle path from plural predicted own-vehicle-path candidates.

Means for Solving Problem

To solve the problems as described above, and to achieve an object, an own-vehicle-path determining method according to the present invention includes calculating a first evaluation value of each of plural predicted own-vehicle-path candidates, calculating a second evaluation value of each of the plural own-vehicle-path candidates, selecting own-vehicle-path candidates with high first evaluation values from the plural own-vehicle-path candidates, selecting own-vehicle-path candidates with high second evaluation values as appropriate own-vehicle-path candidates from the selected own-vehicle-path candidates, and selecting any one of the appropriate own-vehicle-path candidates as an own-vehicle path.

Further, an own-vehicle-path determining method according to the present invention includes calculating a first evaluation value of each of plural predicted own-vehicle-path candidates, calculating a second evaluation value of each of the plural own-vehicle-path candidates, selecting own-vehicle-path candidates with high first evaluation values from the plural own-vehicle-path candidates, and selecting an own-vehicle-path candidate with a highest second evaluation value as a drivable path of an own vehicle from the selected own-vehicle-path candidates.

Further, in the own-vehicle-path determining method according to the present invention, in an aspect of the present invention as described above, own-vehicle-path candidates with the first evaluation values higher than a predetermined value are selected in the selecting own-vehicle-path candidates with high first evaluation values from the plural own-vehicle-path candidates.

Further, in the own-vehicle-path determining method according to the present invention, in an aspect of the present invention as described above, an own-vehicle-path candidate with the second evaluation value higher than a predetermined value is selected in the selecting own-vehicle-path candidates with high second evaluation values from the plural own-vehicle-path candidates.

Further, in the own-vehicle-path determining method according to the present invention, in an aspect of the present invention as described above, the first evaluation value is a value indicating an evaluation of safety of the own vehicle.

Further, in the own-vehicle-path determining method according to the present invention, in an aspect of the present invention as described above, the second evaluation value is a value indicating an evaluation of driving efficiency of the own vehicle.

Further, the own-vehicle-path determining method according to the present invention, in an aspect of the present invention as described above, further includes inputting and setting the predetermined value.

Further, in the own-vehicle-path determining method according to the present invention, in an aspect of the present invention as described above, the predetermined value is set variably in the inputting and setting the predetermined value.

Further, in the own-vehicle-path determining method according to the present invention, in an aspect of the present invention as described above, the predetermined value is set variably so as to increase according to a tread amount of an accelerator pedal in the inputting and setting the predetermined value.

Further, in the own-vehicle-path determining method according to the present invention, in an aspect of the present invention as described above, the predetermined value is set variably so as to decrease according to a tread amount of a break pedal in the inputting and setting the predetermined value.

Further, in the own-vehicle-path determining method according to the present invention, in an aspect of the present invention as described above, the predetermined value is set variably according to an operation of a mode-selecting switch related with a driving mode in the inputting and setting the predetermined value.

Further, an own-vehicle-path determining apparatus according to the present invention includes a first calculator that calculates a first evaluation value of each of plural predicted own-vehicle-path candidates, a second calculator that calculates a second evaluation value of each of the plural own-vehicle-path candidates, and a selector that selects own-vehicle-path candidates with high first evaluation values from the plural own-vehicle-path candidates, selects own-vehicle-path candidates with high second evaluation values as appropriate own-vehicle-path candidates from the selected own-vehicle-path candidates, and selects any one of the appropriate own-vehicle-path candidates as an own-vehicle path.

Further, an own-vehicle-path determining apparatus according to the present invention includes a first calculator that calculates a first evaluation value of each of plural predicted own-vehicle-path candidates, a second calculator that calculates a second evaluation value of each of the plural own-vehicle-path candidates, a selector that selects own-vehicle-path candidates with high first evaluation values from the plural own-vehicle-path candidates, and selects an own-vehicle-path candidate with a highest second evaluation value as a drivable path of an own vehicle from the selected own-vehicle-path candidates.

Further, in the own-vehicle-path determining apparatus according to the present invention, in an aspect of the present invention as described above, the selector selects, when selecting own-vehicle-path candidates with high first evaluation values from the plural own-vehicle-path candidates, own-vehicle-path candidates with the first evaluation values higher than a predetermined value.

Further, in the own-vehicle-path determining apparatus according to the present invention, in an aspect of the present invention as described above, the selector selects, when selecting own-vehicle-path candidates with high second evaluation values from the plural own-vehicle-path candidates, own-vehicle-path candidates with the second evaluation values higher than a predetermined value.

Further, in the own-vehicle-path determining apparatus according to the present invention, in an aspect of the present invention as described above, the first evaluation value is a value indicating an evaluation of safety of the own vehicle.

Further, in the own-vehicle-path determining apparatus according to the present invention, in an aspect of the present invention as described above, the second evaluation value is a value indicating an evaluation of driving efficiency of the own vehicle.

Further, the own-vehicle-path determining apparatus according to the present invention further includes a predetermined value input unit that inputs and sets the predetermined value.

Further, in the own-vehicle-path determining apparatus according to the present invention, in an aspect of the present invention as described above, the predetermined value input unit sets the predetermined value variably.

Further, in the own-vehicle-path determining apparatus according to the present invention, in an aspect of the present invention as described above, the predetermined value input unit sets the predetermined value variably so that the predetermined value increases according to a tread amount of an accelerator pedal.

Further, in the own-vehicle-path determining apparatus according to the present invention, in an aspect of the present invention as described above, the predetermined value input unit sets the predetermined value variably so that the predetermined value decreases according to a tread amount of a break pedal.

Further, in the own-vehicle-path determining apparatus according to the present invention, in an aspect of the present invention as described above, the predetermined value input unit sets the predetermined value variably according to an operation of a mode-selecting switch related with a driving mode.

Effect of the Invention

The own-vehicle-path determining method and the own-vehicle-path determining apparatus according to the present invention calculate the first evaluation value and the second evaluation value of the own vehicle relative to each of the plural predicted own-vehicle-path candidates, select own-vehicle-path candidates with a high first evaluation value and a high second evaluation value as appropriate own-vehicle-path candidates from the plural own-vehicle-path candidates, and select any one of the appropriate own-vehicle-path candidates as an own-vehicle path, whereby an appropriate own-vehicle path can be determined through an appropriate setting of the first evaluation value and the second evaluation value.

Further, the own-vehicle-path determining method and the own-vehicle-path determining apparatus according to the present invention calculate the first evaluation value and the second evaluation value of the own vehicle relative to each of the plural predicted own-vehicle-path candidates, and select an own-vehicle-path candidate having a maximum second evaluation value among those having a high first evaluation value from the plural own-vehicle-path candidates as a drivable path of the own vehicle, whereby an appropriate own-vehicle path can be determined through an appropriate setting of the first evaluation value and the second evaluation value.

Specifically, since the own-vehicle-path determining method and the own-vehicle-path determining apparatus according to the present invention calculate the first evaluation value which indicates an evaluation of the safety of the own vehicle relative to each of the plural predicted own-vehicle-path candidates and the second evaluation value which indicates an evaluation of driving efficiency of each of the own-vehicle-path candidates, and select an own-vehicle-path candidate having a maximum second evaluation value among those having a first evaluation value higher than a set predetermined value as a drivable path of the own vehicle from the plural own-vehicle-path candidates, whereby an own-vehicle path can be determined through an appropriate setting of the predetermined value, which is used for accepting the first evaluation value, depending on a situation while safety and driving efficiency are harmonized in a realistic manner. For example, selection of a passing path is accepted so as to realize early arrival at the destination even though the safety is slightly compromised within a range satisfying the safety standard.

EXPLANATIONS OF LETTERS OR NUMERALS

Figure 1:
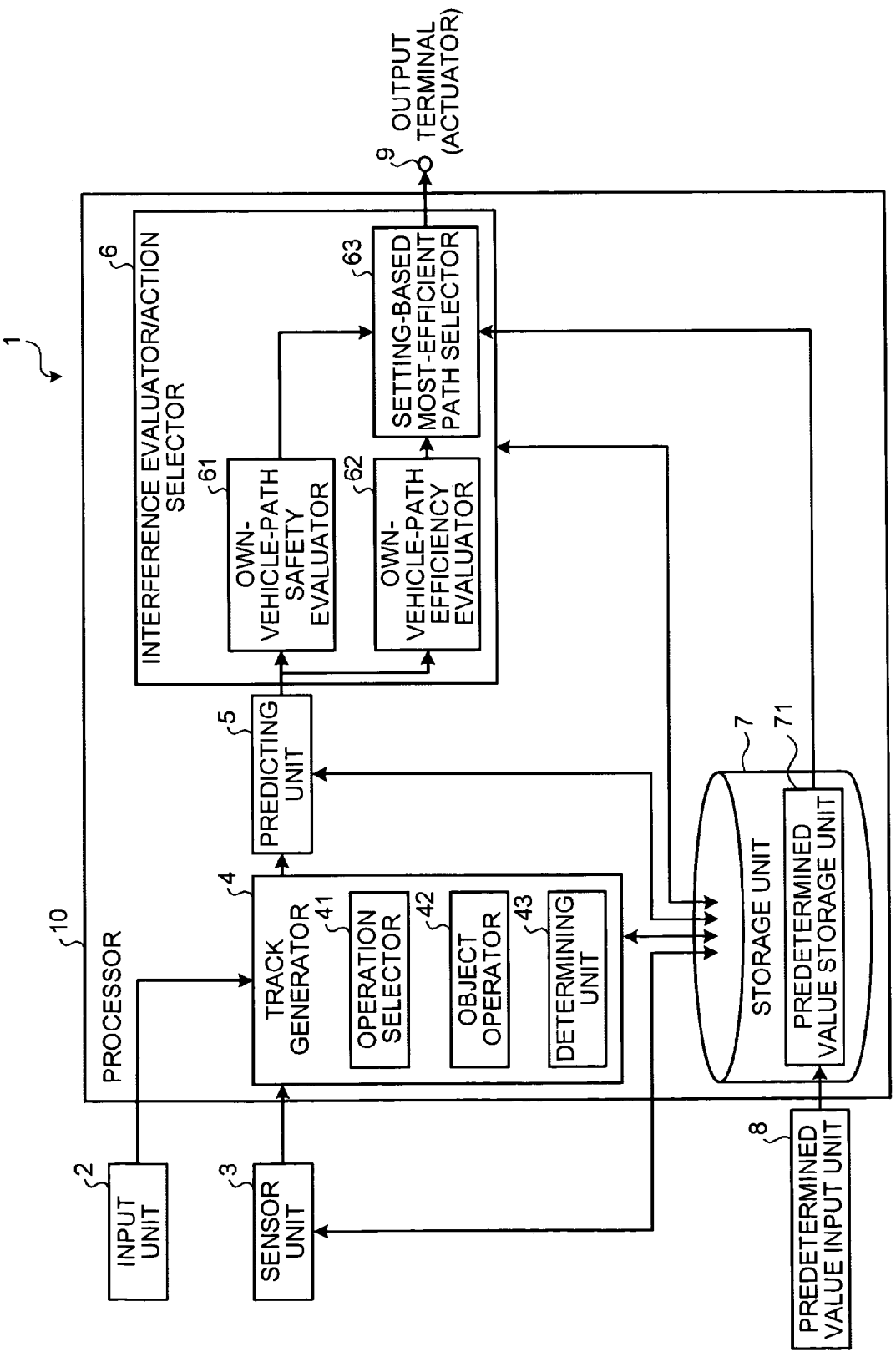
FIG. 1 is a schematic block diagram of a functional configuration of an own-vehicle-path determining apparatus according to one embodiment of the present invention.

1 Own-vehicle-path determining apparatus
6 Interference evaluator/action selector
8 Predetermined value input unit
61 Own-vehicle-path safety evaluator
62 Own-vehicle-path efficiency evaluator
63 Setting-based most-efficient path selector

BEST MODE(S) FOR CARRYING OUT THE INVENTION

Exemplary embodiments of an own-vehicle-path determining method and an own-vehicle-path determining apparatus according to the present invention will be described in detail below with reference to the accompanying drawings. The present invention is not limited by the embodiments. Various modifications can be made to the embodiments without departing from the scope of the present invention.

FIG. 1 is a schematic block diagram of a functional configuration of an own-vehicle-path determining apparatus according to one embodiment of the present invention. The own-vehicle-path determining apparatus is mounted on an own vehicle, which is an automobile running on a road, to detect obstacles such as other vehicles present within a predetermined surrounding range of the own vehicle and determine an own-vehicle path for automatically driving the own vehicle in consideration of detected obstacles.

An own-vehicle-path determining apparatus 1 according to the embodiment includes an input unit 2 which inputs various information from outside, a sensor unit 3 which detects a position and an internal condition of an object present within a predetermined range, a track generator 4 which, based on a result of detection by the sensor unit 3, generates a track representing a possible positional change of an object over time in a time-space configured with time and space, a predicting unit 5 which makes a probabilistic prediction of a path of an object such as the own vehicle and the other vehicle using a track generated by the track generator 4, an interference evaluator/action selector 6 which calculates possibility of interference between the own vehicle and the other vehicle based on the result of prediction of the object in the predicting unit 5 to select an optimal drivable path as the own-vehicle path, a storage unit 7 which stores information such as a track in the time-space generated by the track generator 4 and a result of prediction by the predicting unit 5, a predetermined value input unit 8 which serves to input and set a predetermined value in the storage unit 7 so as to be used in the interference evaluator/action selector 6, and an output terminal 9 which receives an output result (operation signal) selected by the interference evaluator/action selector 6.

The input unit 2 has a function of receiving an input of information such as various types of setting information for the prediction of paths of moving objects such as the own vehicle and the other vehicle. The input unit 2 is implemented with a remote control, a keyboard (including touchscreen-type devices which allow input from a display), a pointing device (such as a mouse and a track pad), for example. Alternatively, a microphone can be arranged as the input unit 2 so that information can be input via voice.

The sensor unit 3 is implemented with a millimeter-wave radar, a laser radar, an image sensor, and the like. The sensor unit 3 includes variety of sensors such as a speed sensor, an acceleration sensor, a rudder angle sensor, and an angular velocity sensor, and is able to detect moving condition of the own vehicle. An internal condition of the object detected by the sensor unit 3 has significance in prediction of objects, and preferably is a physical value such as speed, acceleration, angular velocity, and angular acceleration of the object. Here, the physical value, such as speed and angular velocity of the moving object such as an own vehicle can be zero (which means that the object is in a halt) naturally.

The track generator 4 includes an operation selector 41 which selects an operation for a moving object such as the own vehicle and the other vehicle from plural operations, an object operator 42 which performs an operation selected by the operation selector 41 for a predetermined time period, and a determining unit 43 which determines whether the position and the internal condition of the moving object such as the own vehicle and the other vehicle satisfy a predetermined condition after the operation by the object operator 42. The predicting unit 5 performs a probabilistic predicting calculation of the path of the object using the track output from the track generator 4 for each moving object such as the own vehicle and the other vehicle.

The interference evaluator/action selector 6 includes an own-vehicle-path safety evaluator 61 which calculates a safety evaluation value (first evaluation value) indicating an evaluation of the safety of the own vehicle by calculating a possibility of interference such as collision between the other vehicle and each of the plural own-vehicle-path candidates predicted by the predicting unit 5, an own-vehicle-path efficiency evaluator 62 which calculates an efficiency evaluation value (second evaluation value which is an evaluation value indicating how fast the vehicle can reach the destination, for example) which indicates an evaluation of driving efficiency of each of the plural own-vehicle-path candidates predicted by the predicting unit 5, and a setting-based most-efficient path selector 63 which selects, as a drivable path of the own vehicle, an own-vehicle-path candidate whose safety evaluation value satisfies safety condition by exceeding a predetermined set value and which has a highest efficient evaluation value among the plural own-vehicle-path candidates.

The predetermined value input unit 8 allows setting and input of a predetermined value to be employed in the process by the setting-based most-efficient path selector 63 for determining whether the safety evaluation value of each ownvehicle-path candidate is acceptable in terms of safety. For example, an accelerator pedal, a brake pedal, and a mode-selecting switch of driving modes (which switches between, for example, a sport mode and a luxury mode) can be adopted as the predetermined value input unit 8.

The storage unit 7 stores operations for the selection by the operation selector 41 of the track generator 4, in addition to the track generated by the track generator 4 and the result of prediction by the predicting unit 5. Further, the storage unit 7 includes a predetermined value storage unit 71 which stores a predetermined value input and set by the predetermined value input unit 8, and supplies the stored predetermined value to the setting-based most-efficient path selector 63 for the determination process. The storage unit 7 is implemented with a Read Only Memory (ROM) which previously stores therein a program that starts up a predetermined Operation System (OS), an object-path predicting program, an own-vehicle path determining program, and the like according to the embodiment, and a Random Access Memory (RAM) which stores therein operation parameters, data, and the like for each process. Alternatively, the storage unit 7 can be implemented with an interface and a computer-readable recording medium corresponding to the interface in such a manner that the computer-readable recording medium can be mounted in the interface provided in the own-vehicle-path determining apparatus 1.

In the own-vehicle-path determining apparatus 1 with the above-described functional configuration, the track generator 4, the predicting unit 5, the interference evaluator/action selector 6, and the storage unit 7 are implemented with a processor (computer) 10 provided with a Central Processing Unit (CPU) which has calculation and control functions. The CPU of the own-vehicle-path determining apparatus 1 executes calculation processes related with the object-path predicting method and the own-vehicle-path determining method according to the embodiment by reading out the information stored in the storage unit 7 and a variety of programs such as the object-path predicting program and the own-vehicle-path determining program from the storage unit 7.

The object-path predicting program and the own-vehicle-path determining program according to the embodiment can be recorded on a computer-readable recording medium such as a hard disk, flexible disk, CD-ROM, DVD-ROM, flash memory, and MO disk, and widely distributed.

Figure 2:
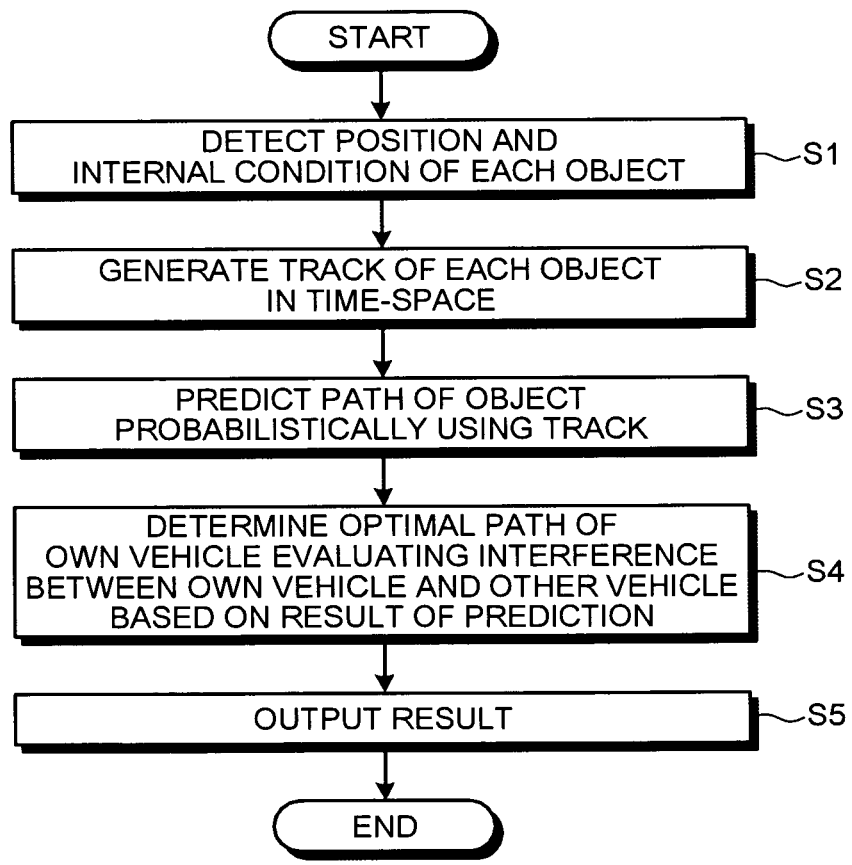
FIG. 2 is a flowchart of an overall process procedure of an object-path predicting method and an own-vehicle-path determining method according to one embodiment.

The object-path predicting method and the own-vehicle-path determining method according to the embodiment of the present invention will be described. FIG. 2 is a flowchart of an overall process procedure of the object-path predicting method and the own-vehicle-path determining method according to the embodiment. In the following description, a moving object such as an own vehicle and another vehicle for which the prediction is performed are assumed to be moving on a two-dimensional plane. However, the object-path predicting method and the own-vehicle-path determining method according to the embodiment can be applied for controlling an object moving within a three-dimensional space or an actuator (such as a robot arm) which has any degree of freedom.

Firstly, the sensor unit 3 detects the position and the internal condition relative to the own vehicle, of a moving object such as the other vehicle present within a predetermined range, and the detected information is stored in the storage unit 7 (step S1). Hereafter, the internal condition of the object is assumed to be specified by speed (more specifically, speed v and direction θ). In step S1, the sensor unit 3 also detects the internal condition of the own vehicle and stores the detected information in the storage unit 7.

Figure 3:
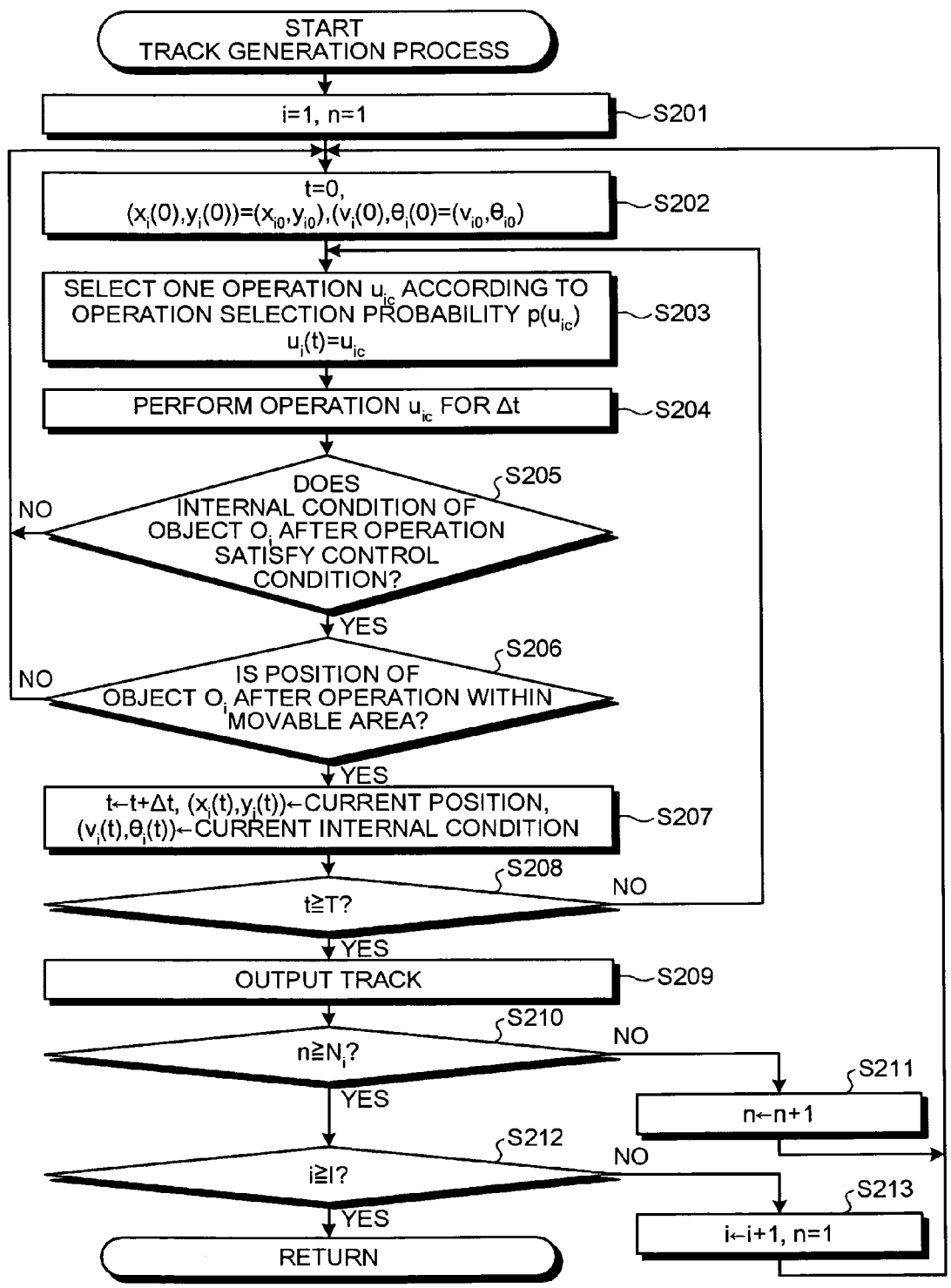
FIG. 3 is a detailed flowchart of a track generation process in a track generator.

The track generator 4 generates future tracks of each moving object such as the own vehicle and the other vehicle using the result of detection input by the sensor unit 3 (step S2). FIG. 3 is a detailed flowchart of a track generation process in the track generator 4. FIG. 3 is based on the assumption that the total number of objects (including the own vehicle) detected by the sensor unit 3 is I, and that the track generator 4 performs a calculation for generating the track $N_i$ times for each object $O_i$ ($1 \leq i \leq I$, i is a natural number; therefore, both I and $N_i$ are natural numbers). The time of track generation (track generation time) is represented by T (>0).

Firstly, initialization is performed. In the initialization, a value of a counter i for identifying the object is set to one, and a value of a counter n for indicating the number of track generations for an identical object is set to one (step S201).

Secondly, the track generator 4 reads out the result of detection by the sensor unit 3 from the storage unit 7 and sets the read result of detection as an initial state (step S202). Specifically, time t is set to zero, and an initial position $(x_i(0), y_i(0))$ and an initial internal condition $(v_i(0), \theta_i(0))$ are set respectively to information $(x_{i0}, y_{i0})$ and $(v_{i0}, \theta_{i0})$ input from the sensor unit 3.

Subsequently, the operation selector 41 selects one operation from plural selectable operations as an operation $u_i(t)$ to be performed during a subsequent time $\Delta t$ according to an operation selection probability attached to each operation in advance (step S203). Operation selection probability $p(u_{ic})$ indicating the probability of selection of an operation $u_{ic}$ is defined by association between a predetermined random number and each element of a set of operations $\{u_{ic}\}$ selectable as $u_i(t)$. A different operation selection probability $p(u_{ic})$ may be attached to each operation $u_{ic}$. Alternatively, an equal probability may be attached to all the elements in the set of operations $\{u_{ic}\}$. In the latter case, $p(u_{ic})=1/$(total number of selectable operations). Further, the operation selection probability $p(u_{ic})$ can be defined by a function dependent on the position and the internal condition of the own vehicle and a surrounding road environment.

In general, the operation $u_{ic}$ includes plural elements, and contents of selectable operations are different for each type of the object $O_i$. For example, if the object $O_i$ is a four-wheeled vehicle, acceleration and angular velocity of the four-wheeled vehicle are determined according to a manner of steering and a manner of treading of an accelerator. In view of this, when the object $O_i$ is the four-wheeled vehicle, the operation $u_{ic}$ performed on the object $O_i$ is determined based on factors such as the acceleration and the angular velocity. On the other hand, when the object $O_i$ is a person, the operation $u_{ic}$ may be specified by the speed and the direction.

A more specific example of the setting of the operation $u_{ic}$ is described. When the object $O_i$ is an automobile, the acceleration is set within the range of −10 to +30 km/h/sec, and the steering angle is set within the range of −7 to +7 degrees/sec (in each case, the direction is indicated by the sign), whereas when the object $O_i$ is a person, the speed is set within the range of 0 to 36 km/h, and the direction is set within the range of 0 to 360 degrees. The quantities mentioned here are all continuous quantities. In such a case, appropriate discretization may be performed to make elements of each operation finite for forming the set of operations $\{u_{ic}\}$.

Subsequently, the object operator 42 performs the operation $u_{ic}$ selected in step S203 for the time $\Delta t$ (step S204). The time $\Delta t$ may be set approximately to 0.1 to 0.5 seconds, for example. The $\Delta t$ can be a constant value or a variable value which depends, for example, on a degree of emergency of a surrounding situation. In the following, the Δt is a constant value. The track generation time T is an integral multiple of Δt.

Subsequently, the determining unit 43 determines whether the internal condition of the object $O_i$ after the operation $u_{ic}$ in step S204 satisfies a predetermined control condition or not (step S205). The determining unit 43 also determines whether the position of the object $O_i$ after the operation $u_{ic}$ is within a movable area or not (step S206). The control condition used in the determination in step S205 is determined according to the type of the object $O_i$. For example, when the object $O_i$ is a four-wheeled vehicle, the control condition is determined based on the speed range after the operation in step S204 and a vehicle G with maximum acceleration after the operation in step S204. On the other hand, the movable area used in the determination in step S206 is an area such as a road (including a vehicular road and a sidewalk). Hereafter, when the object is within the movable area, it is said that "the moving condition is satisfied".

If any one of the conditions is not satisfied as a result of the determination by the determining unit 43 (No in step S205 or No in step S206), the process returns to step S202. On the other hand, if the position and the internal condition of the object $O_i$ after the operation $u_{ic}$ in step S204 are found to satisfy all the conditions as a result of determination by the determining unit 43 (Yes in Step S205 and Yes in step S206), the time is made to advance by Δt (t←t+Δt), and the position and the internal condition after the operation in step S204 are set respectively to $(x_i(t), y_i(t))$ and $(v_i(t), \theta_i(t))$ (step S207).

The processes in steps S202 to S207 described above are repeated until the track generation time T elapses. If the newly defined time t in step S207 has not reached T (No in step S208), the process returns to step S203 to repeat the processes. On the other hand, if the newly defined time t in step S207 reaches T (Yes in step S208), the track for the object $O_i$ is output and stored in the storage unit 7 (step S209).

Figure 4:
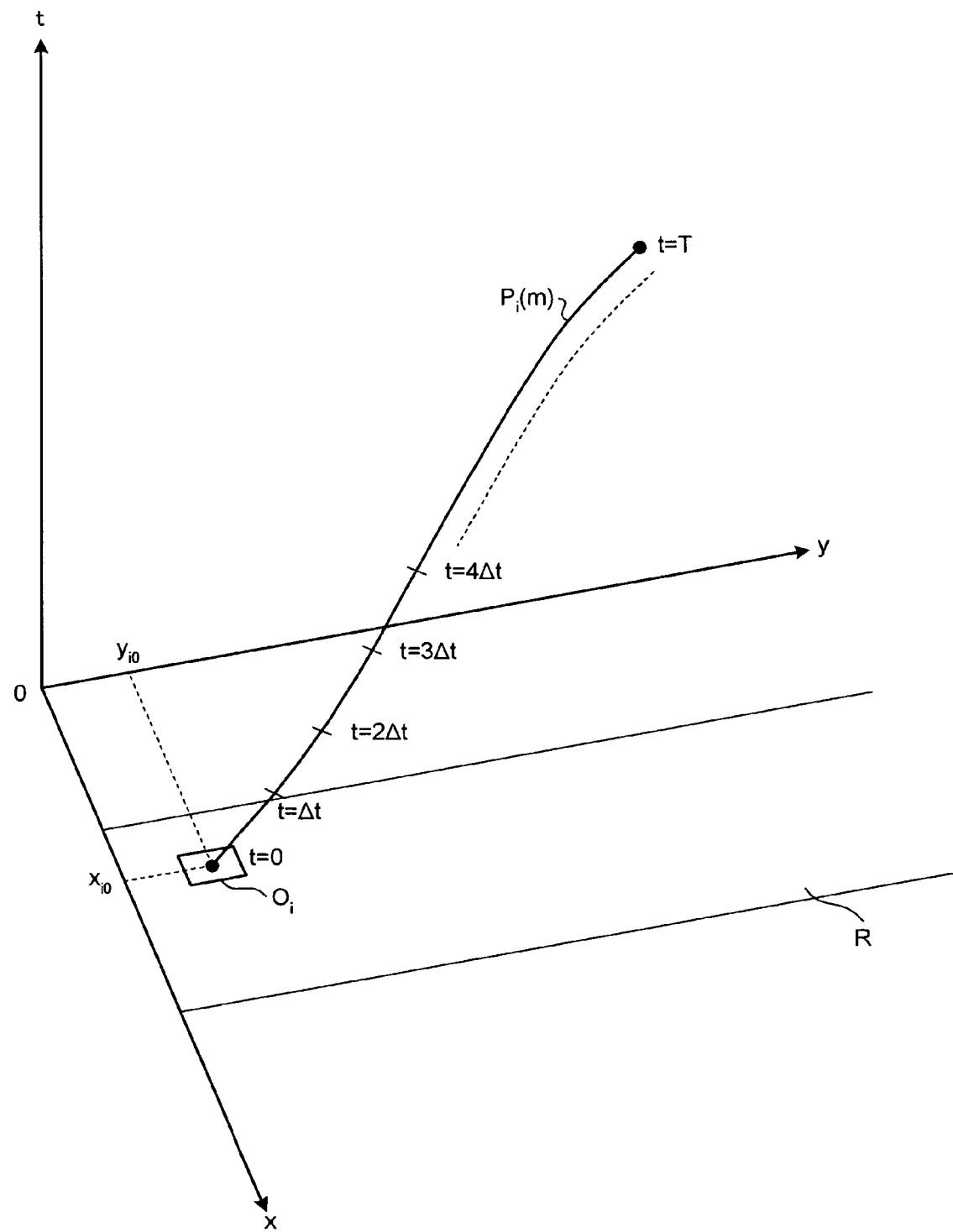
FIG. 4 is a schematic diagram of a generated track in a three-dimensional time-space.

FIG. 4 is a schematic diagram of a track generated for the object $O_i$ through the series of processes from steps S203 to S207 repeated over the time t=0, Δt, 2Δt, . . . , T. In FIG. 4, a track $P_i(m)$ ($1 \leq m \leq N_i$, m is a natural number) passes through a three-dimensional time-space (x, y, t) with two space dimensions (x, y) and one time dimension (t). When the track $P_i(m)$ is projected onto an x-y plane, a predicted path of the object $O_i$ in the two-dimensional space (x, y) can be obtained.

If the value of the counter n has not reached $N_i$ after step S209 (No in step S210), the value of the counter n is incremented by one (step S211), and the process returns to step S203. Then, the processes from steps S203 to S208 are repeated until the track generation time T elapses.

Figure 5:
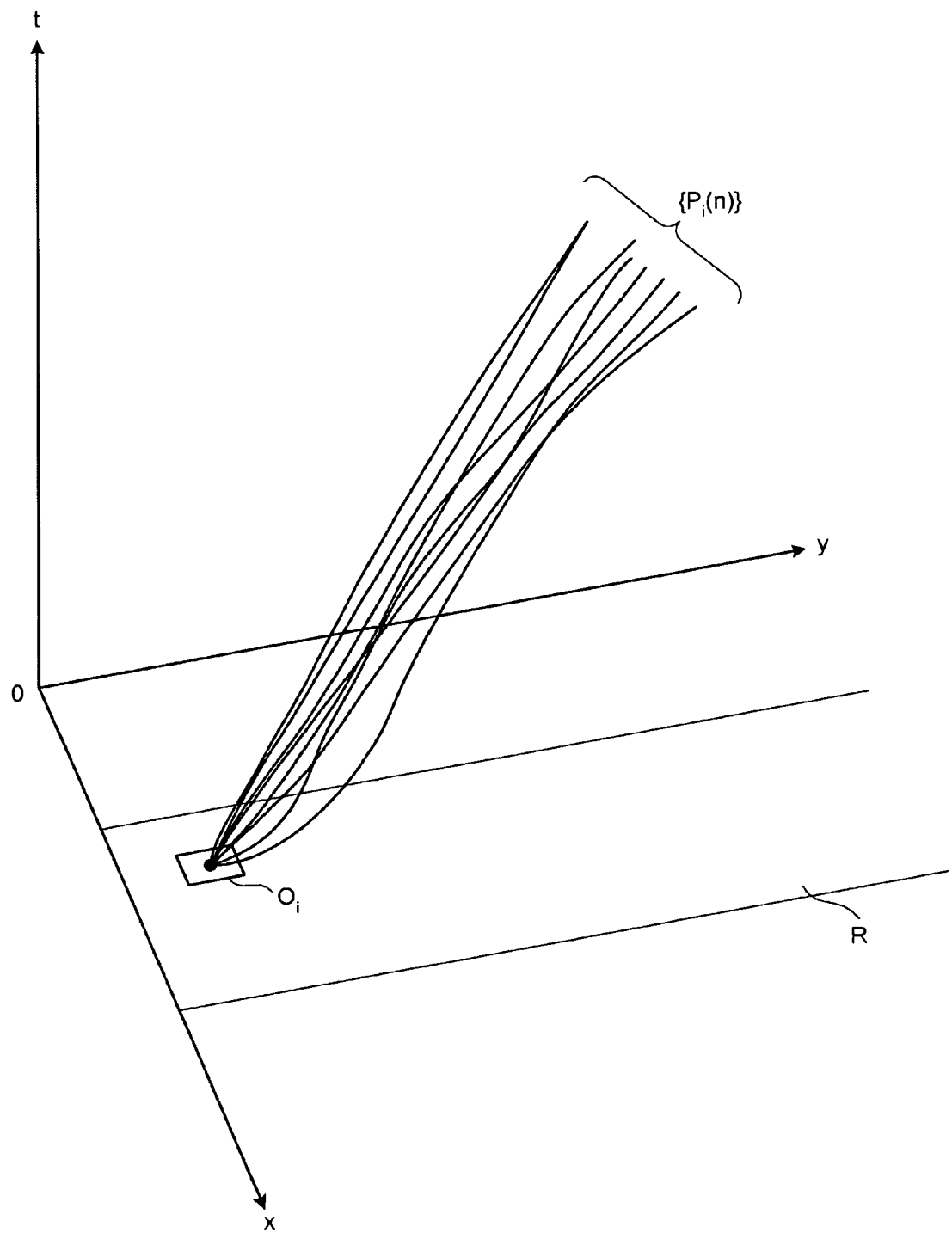
FIG. 5 is a schematic diagram of a generated set of tracks of one object in a three-dimensional time-space.

When the value of the counter n reaches $N_i$ in step S210 (Yes in step S210), the generation of all the tracks for the object $O_i$ is completed. FIG. 5 is an explanatory diagram schematically showing in the three-dimensional time-space, a set of tracks $\{P_i(n)\}$ consisting of tracks $P_i(1), P_i(2), \ldots, P_i(N_i)$ of the number $N_i$ generated for a single object $O_i$. A starting point of each track as an element of the set of tracks $\{P_i(n)\}$, in other words, an initial position $(x_{i0}, y_{i0}, 0)$ is identical (see step S202). FIG. 5 is merely a schematic diagram and several thousands or more can be set as the value of Ni, for example.

If the counter n reaches $N_i$ in step S210, and the value of the counter i for object identification has not reached the total number of objects, I (No in step S212), the value of the counter i is incremented by one and the value of the counter n for track generation counting is initialized to one (step S213). Then the process returns to step S202 and repeats the process. On the other hand, if the value of the counter i for object identification reaches I (Yes in step S212), it means that the track generation has been completed for all the objects. Thus, the track generation process in step S2 is finished and the process proceeds to step S3.

Figure 6:
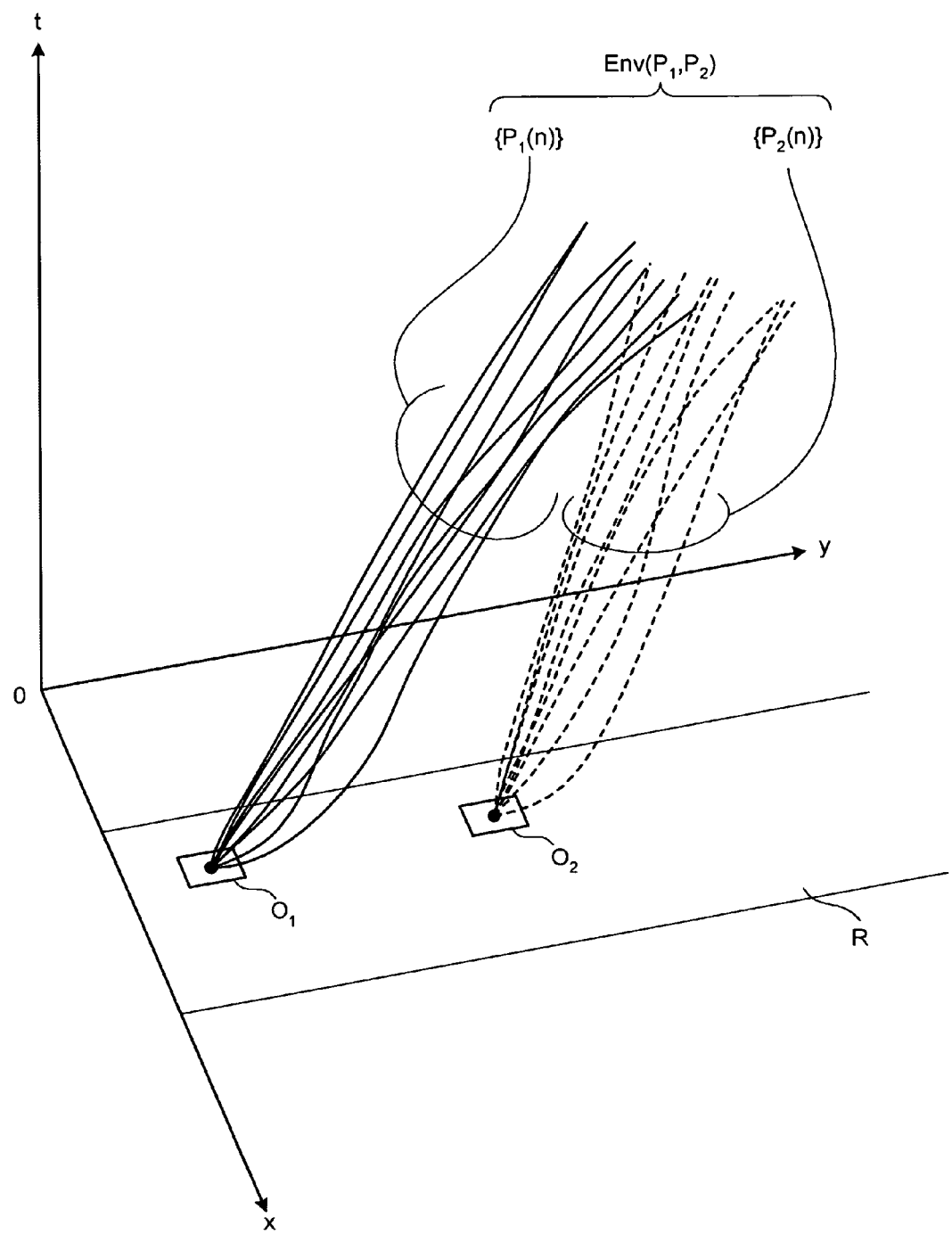
FIG. 6 is a schematic diagram of a configuration of a time-space environment formed by the object-path predicting method.

When the track generation process is performed for a predetermined times for all the objects detected by sensor unit 3, a time-space environment Env (P) is formed. The time-space environment Env (P) is configured with a set of tracks which the plural objects present in the predetermined range within the three-dimensional time-space can take. FIG. 6 is an explanatory diagram schematically showing an example of configuration of the time-space environment Env (P). The time-space environment Env (P) shown in FIG. 6 consists of a set of tracks $\{P_1(n)\}$ of an objects $O_1$ (shown by a solid line in FIG. 6) and a set of tracks $\{P_2(n)\}$ of an object $O_2$ (shown by a broken line in FIG. 6). More specifically, the time-space environment Env (P) represents a time-space environment of two objects $O_1$ and $O_2$ moving on a flat, linear road R similar to a highway in a +y-axis direction. In the embodiment, the track generation is performed separately for each object without considering the correlation between the objects. Hence, sometimes the tracks of different objects intersect within the time-space.

In FIG. 6, a per unit volume density of the set of tracks $\{P_i(n)\}$ (i=1, 2) within each area in the time-space is a density of a probability of presence of the object $O_i$ in each area in the time-space (hereinafter referred to "time-space probability density"). Hence, the probability of the object $O_i$ passing through a predetermined area in the three-dimensional time-space can be found based on the time-space environment Env (P) formed by the track generation process in step S2. Since the time-space probability density is merely a probabilistic concept for this time-space, sum of time-space probability densities for one object within the time-space is not always one.

A specific value of the track generation time T is, if set to a constant value in advance, preferably set to such a value that the probability density distribution in the time-space becomes uniform if the track generation continues after the time reaches the value T. Namely, the specific value of T is preferably set so that the calculation after the time reaches T is meaningless. For example, when the object is a four-wheeled vehicle in a normal driving, T is set to a value as low as approximately 5 seconds (T=5). In this case, if the operation time Δt in step S204 is approximately 0.1 to 0.5 second, a series of processes from steps S203 to S207 will be repeated 10 to 50 times for the generation of each track $P_i(m)$.

In addition, it is preferable to set a different value as the track generation time T for each type of roads such as a highway, an open road, and a two-lane road, and switch from one value to another by using a method of reading out a type of a road on which the own vehicle is currently running from map data based on positional data, or using a method of reading out a type of a road using a road recognizing apparatus utilizing image recognition and the like.

Further, it is preferable to statistically evaluate the probability density distribution in the time-space based on the tracks obtained through calculation before the track generation time T elapses, and to perform adaptive control so as to shorten the track generation time T when the distribution is uniform and lengthen the track generation time T when the distribution is not uniform.

Further, it is possible to prepare (plural) possible paths of the own vehicle in advance, and perform the prediction only up to the track generation time T after which the probability of the own-vehicle path intersecting with the path of other object is constant. In this case, a condition may be set so that the prediction is stopped when an increase in the degree of risk, corresponding to each increase Δt in time of prediction, of each possible path of the own vehicle becomes constant. When such configuration is adopted, needless to say, the setting is made so as to make end points of the possible paths of the own vehicle at a future side widely dispersed in the space, so that information can be obtained for determining a current path for securing the safety.

After the track generation process for each object as described above, the predicting unit 5 performs a probabilistic prediction of possible paths (path candidates) of each object such as the own vehicle and the other vehicle (step S3). Hereinbelow, as a specific example of the predicting calculation process in the predicting unit 5, a calculation of the probability of selection of a specific track $P_i(m)$ among the set of tracks $\{P_i(n)\}$ generated for the object $O_i$ will be described. It is obvious, however, that the following is merely an example of the predicting calculation.

When the $N_i$ number of the tracks (path candidates) are generated for the object $O_i$, a probability $p(P_i(m))$ of one track $P_i(m)$ becoming an actual track among $N_i$ tracks is calculated as follows. If operation series $\{u_{im}(t)\}$ for realizing the track $P_i(m)$ of the object $O_i$ is $\{u_{im}(0), u_{im}(\Delta t), u_{im}(2\Delta t), \ldots, u_{im}(T)\}$, a probability of an operation $u_{im}(t)$ being selected at the time t is $p(u_{im}(t))$. Hence, the probability of the operation series $\{u_{im}(t)\}$ being performed over time t=0 to T is:

[Formula 1]

$$p(u_{im}(0)) \cdot p(u_{im}(\Delta t)) \cdot p(u_{im}(2\Delta t)) \ldots p(u_{im}(T)) = \prod_{t=0}^{T} p(u_{im}(t)) \quad (1)$$

Hence, when the set of tracks $\{P_i(n)\}$ of $N_i$ tracks is obtained for the object $O_i$, the probability $p(P_i(m))$ of one possible track $P_i(m)$ of the object $O_i$ being selected is:

[Formula 2]

$$p(P_i(m)) = \frac{\prod_{t=0}^{T} p(u_{im}(t))}{\sum_{n=1}^{N_i} \left( \prod_{t=0}^{T} p(u_{im}(t)) \right)} \quad (2)$$

If all the operations $u_{im}(t)$ are selected with an equal probability $p_0$ (where $0<p_0<1$), the formula (1) becomes

[Formula 3]

$$\prod_{t=0}^{T} p(u_{im}(t)) = p_0^s \quad (3)$$

Hence, the sum of the probabilities of the tracks $P_i(m)$ included in the possible $N_i$ tracks of the object $O_i$ is, if the number of discretization steps from t=0 to t=T is represented as s, represented as $N_k p_0^s$. The probability $p(P_i(m))$ of one track $P_i(m)$ among them being selected is, with the substitution of formula (3) into the formula (2):

[Formula 4]

$$p(P_i(m)) = \frac{1}{N_i} \quad (4)$$

Thus, the probability $p(P_i(m))$ is not dependent on the track $P_i(m)$.

If the number of generated tracks (path candidates) is the same for all the objects (and is N) in the formula (4), $p(P_i(m))=1/N$ and is constant regardless of the objects $O_i$, since the $N_1=N_2=\ldots=N_I=N$ (constant value). In this case, the standardization of the value of probability $p(P_i(m))$ to one can simplify the predicting calculation in the predicting unit 5 and allow for more rapid operation of a predetermined predicting calculation.

The predicting unit 5 finds the probability of presence of the object $O_i$ per unit volume in each area of the tree-dimensional time-space based on the probability $p(P_i(m))$ calculated for each of the objects $O_i$ (i=1, 2, ..., I). The probability of presence corresponds to the time-space probability density of the set of tracks $\{P_i(n)\}$ in the three-dimensional time-space. In an area where the density of passing tracks is high, the probability of presence is generally high.

Figure 7:
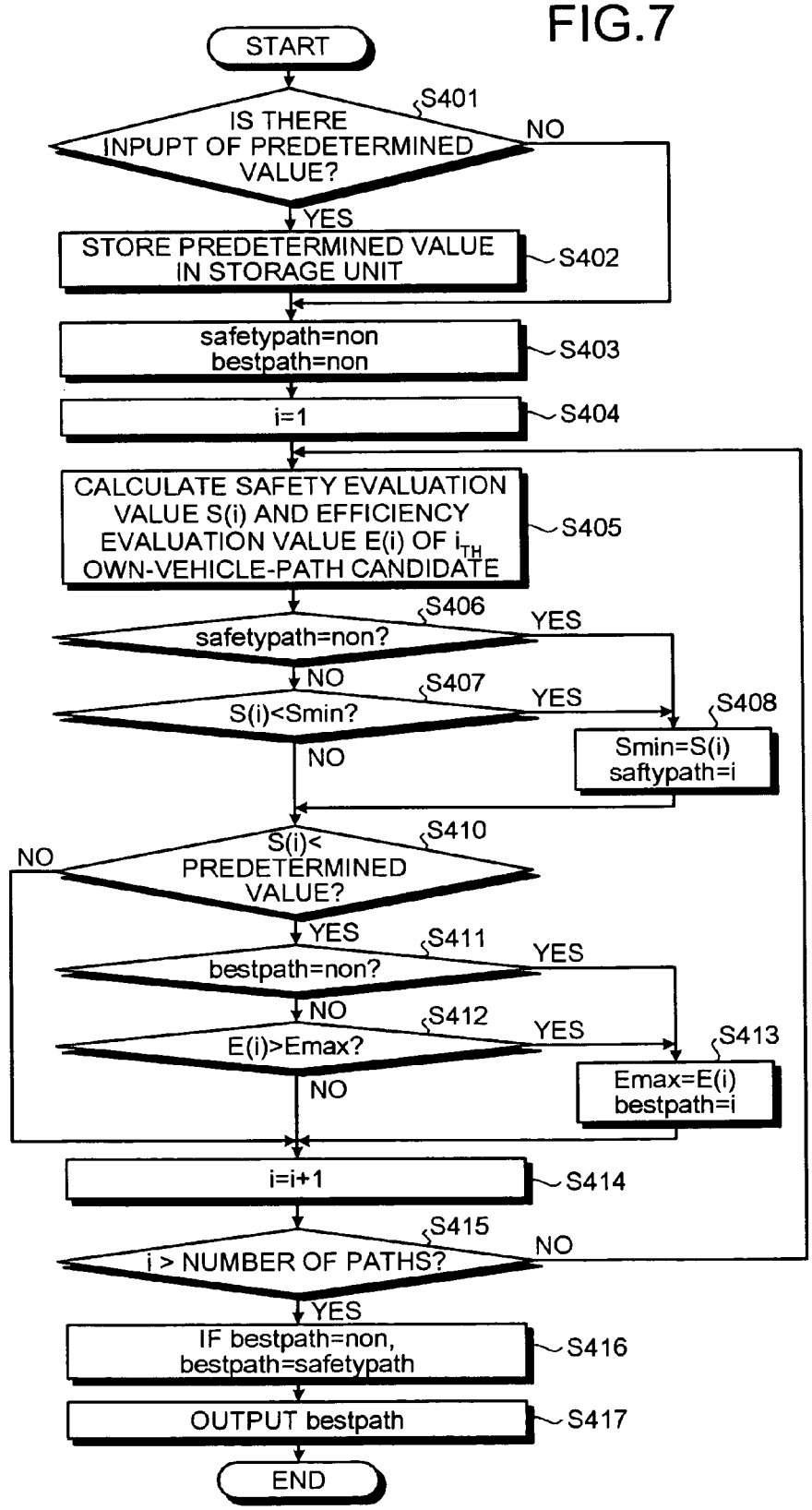
FIG. 7 is a flowchart of an example of a path determination process in an interference evaluator/action selector.

Subsequent to step S3 described above, the interference evaluator/action selector 6 determines an optimal path of the own vehicle while evaluating the interference between the own vehicle and the other vehicle based on the result of prediction in the predicting unit 5 (step S4) and outputs the result to the output terminal 9 (step S5). FIG. 7 is a flowchart of an interference evaluation/path selection process in the interference evaluator/action selector 6. Firstly, it is checked whether the predetermined value input unit 8 makes a variable input setting on the predetermined value or not (step S401). When the variable input is made on the predetermined value (Yes in step S401), the input predetermined value is stored in the predetermined value storage unit 71 of the storage unit 7 (step S402). The predetermined value may be set in the predetermined value storage unit 71 in advance.

Then, a safety evaluation value indicating an evaluation of the safety of the own vehicle and an efficiency evaluation value indicating an evaluation of the driving efficiency of the own vehicle are sequentially calculated for each of the plural own-vehicle-path candidates generated and predicted by the predicting unit 5 for the own vehicle. The safety evaluation value and the efficiency evaluation value are used for path determination. Firstly, a safety evaluation value S(1) and an efficiency evaluation value E(1) of a first own-vehicle-path candidate among the plural own-vehicle-path candidates are calculated. The safety evaluation value of the own vehicle is obtained by calculating a possibility of interference between the other vehicle and the own-vehicle-path candidate, and evaluating a degree of the possibility as a degree of interference, for example, based on a collision probability. As the degree of interference increases, the possibility of collision and the like of the other vehicle increases. The evaluation is not limited to an evaluation based on the possibility of collision, and may be a degree of interference based on a degree of shock of the collision, a degree of financial damage caused by the collision, a degree of minimum time amount of the collision. The efficiency evaluation value of the own vehicle is a value indicating an evaluation on how fast the vehicle can arrive the destination, for example. The predicted own-vehicle-path candidate obtains a higher efficiency evaluation value as a travelable distance from the current position to the destination is longer. The evaluation of the driving efficiency of the own vehicle may be performed for each of the predicted own-vehicle-path candidates based on various factors, for example, how smoothly the acceleration and deceleration and steering can be performed, fuel cost, predicted time till the arrival to the destination.

Figure 8:
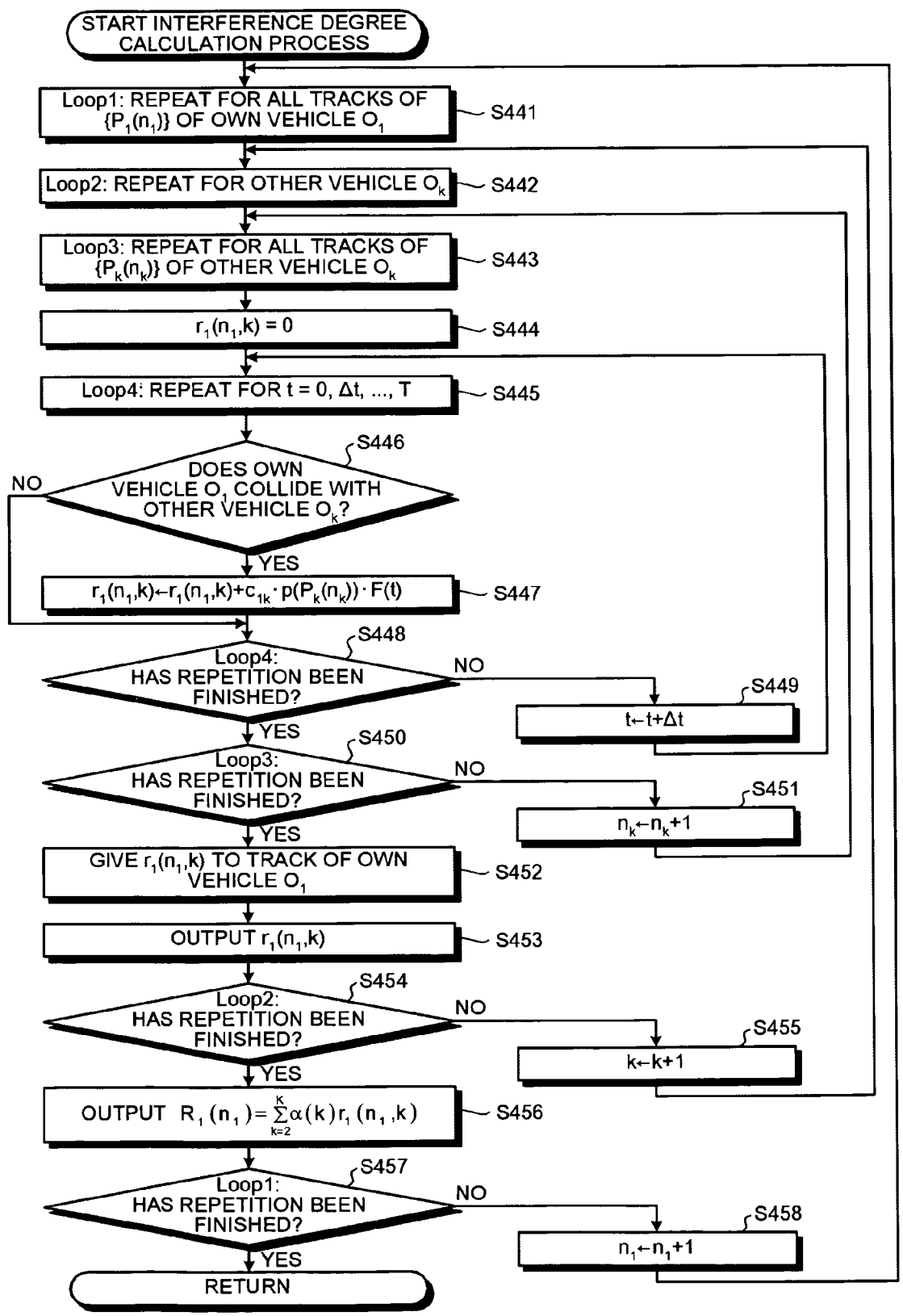
FIG. 8 is a flowchart of an example of an interference degree calculation process in an own-vehicle-path safety evaluator.

Referring to FIG. 8, the interference evaluation process for calculating the safety evaluation value in the step described above and in step S405 mentioned later, and the like will be described. FIG. 8 is a flowchart of an example of an interference degree calculation process in the own-vehicle-path safety evaluator 61. In the following description, the object $O_1$ is assumed to be the own vehicle. Further, for the convenience of description, other objects $O_k$ (k=2, 3, ..., K) are all assumed to be four-wheeled vehicles, and collectively referred to as other vehicle $O_k$. The interference evaluation process shown in FIG. 8 includes four loop processes, and evaluates the interference between all elements of the set of tracks $\{P_l(n1)\}$ of the own vehicle $O_1$ found in step S3 and all sets of tracks $\{P_k(n_k)\}$ of the other vehicle $O_k$. The safety evaluation value is calculated as the degree of interference.

Firstly, a loop process (Loop1) starts for all the tracks of the own vehicle $O_1$ (step S441). At this time, one track in the set of tracks $\{P_1(n_1)\}$ is selected and the following process is performed on the selected track $P_1(m_1)$.

Secondly, a loop process (Loop2) starts for the other vehicle $O_k$ (step S442). In the Loop2, the counter k for the identification of the other vehicle is initialized to two, and the value of the counter k is incremented every time the loop process finishes.

A loop process (Loop3) is performed also for the other vehicle $O_k$ with respect to all the elements of the set of tracks $\{P_k(n_k)\}$ generated in step S3 (step S443). In the loop process, a degree of interference determined by a value $n_1$ for identifying the repetition of the Loop1, in other words, for identifying the track generated for the own vehicle $O_1$ and a counter k for identifying the other vehicle is set to $r_1(n_1, k)$, and the value of $r_1(n_1, k)$ is set to zero (step S444).

Subsequently, a loop process (Loop4) for evaluating the interference between the track $P_1(n_1)$ of the own vehicle $O_1$ and the track $P_k(n_k)$ of the other vehicle $O_k$ starts (step S445). In Loop4, a difference in positional coordinate (x, y) between the two tracks $P_1(n_1)$ and $P_k(n_k)$ is sequentially obtained at time t=0, Δt, ..., T. Since the position of each track is defined as the center of the vehicle, when the difference in spatial positional coordinate (x, y) between two tracks becomes smaller than a predetermined value (such as a standard width or a length of the vehicle), the own vehicle $O_1$ can be regarded as colliding with the other vehicle $O_k$.

Figure 9:
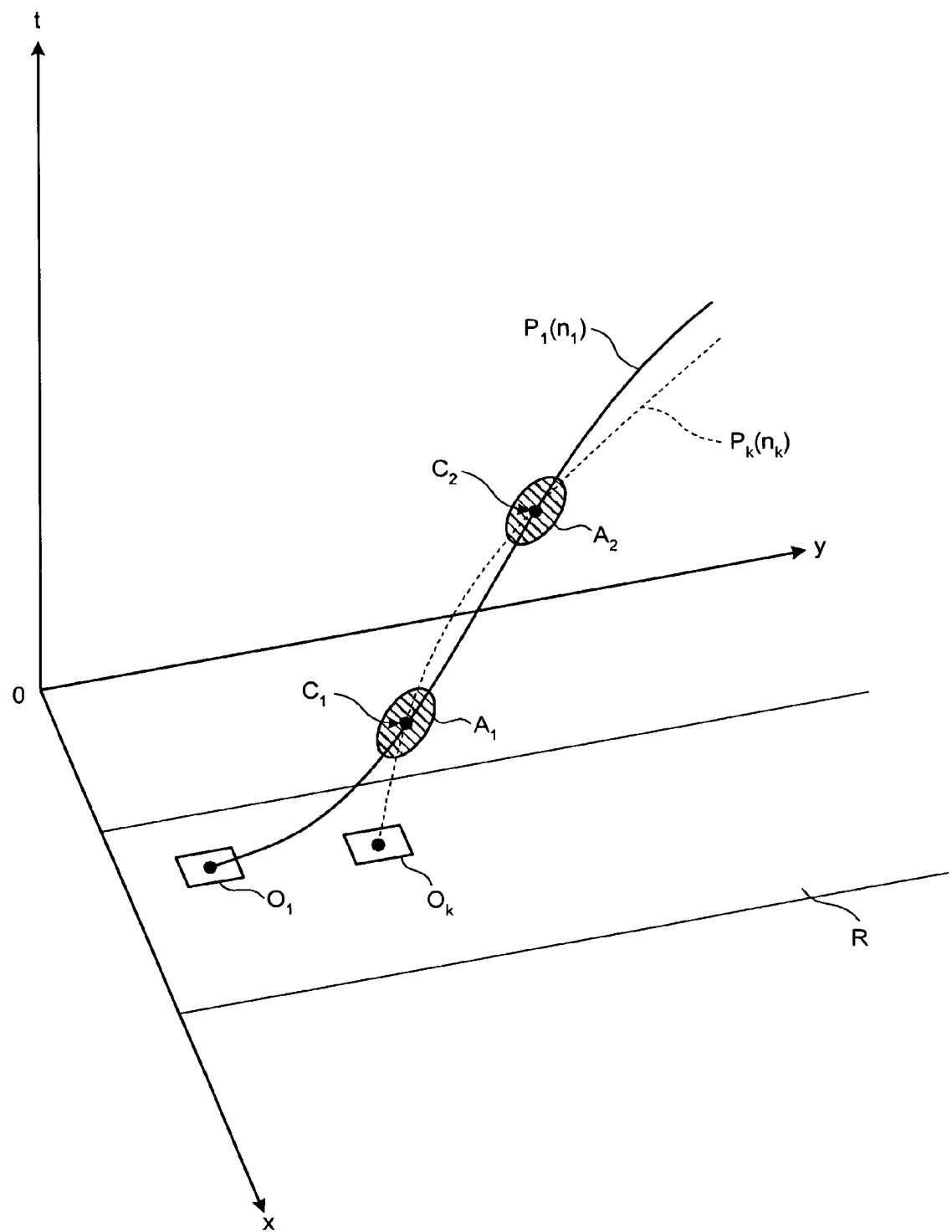
FIG. 9 is a schematic diagram showing a relation between a track of an own vehicle and a track of another vehicle in a time-space.

FIG. 9 is a schematic diagram of a relation between the track $P_1(n_1)$ of the own vehicle $O_1$ and the track $P_k(n_k)$ of the other vehicle $O_k$ in the time-space. In FIG. 9, the track $P_1(n_1)$ and the track $P_k(n_k)$ intersect with each other at two points $C_1$ and $C_2$. Hence, around the two points $C_1$ and $C_2$, areas $A_1$ and $A_2$ exist where the distance between two tracks at the same time point is shorter than a predetermined value. Therefore, at a time when two tracks $P_1(n_1)$ and $P_k(n_k)$ are in the areas $A_1$ and $A_2$, it is determined that the own vehicle $O_1$ and the other vehicle $O_k$ collide. As is obvious from FIG. 9, in the time-space environment formed according to the embodiment, even when two tracks collide once, subsequent tracks are generated. This is because the track is generated independently for each object.

After the difference in the positional coordinate (x, y) is found, when the own vehicle $O_1$ and the other vehicle $O_k$ collide in the sense as described above (Yes in step S446), the value of the degree of interference $r_1(n_1, k)$ is increased as follows (step S447):

[Formula 5]

$$r_1(n_1,k) \leftarrow r_1(n_1,k) + c_{1k} \cdot p(P_k(n_k)) \cdot F(t) \qquad (5)$$

Figure 10:
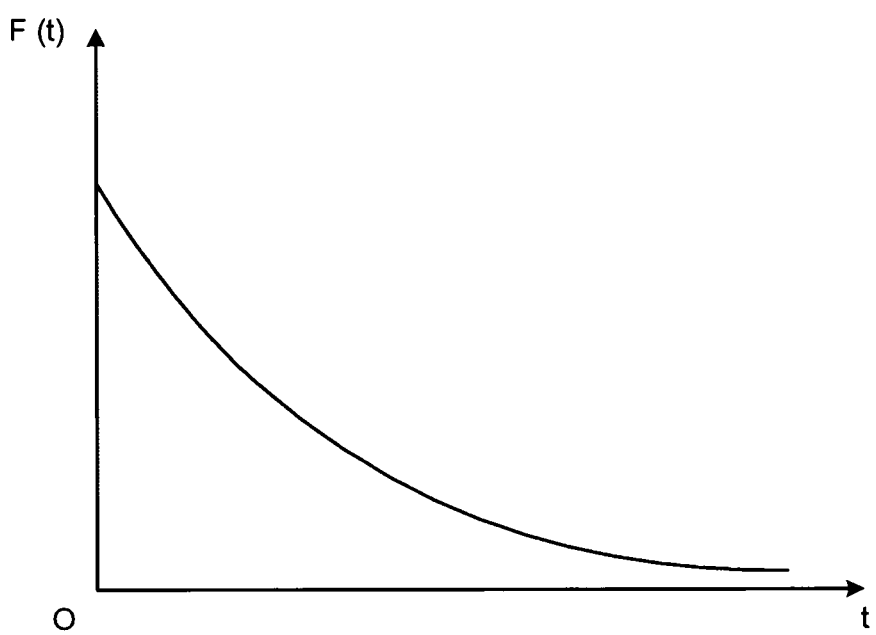
FIG. 10 is a characteristic graph indicating time dependence of inter-object interference.

A second term $c_{1k} \cdot p(P_k(n_k)) \cdot F(t)$ will be described. Firstly, $c_{1k}$ is a positive constant value, and can be set as $c_{1k}=1$, for example. Further, $p(P_k(n_k))$ is a value defined by formula (2) and indicates a probability of one track $P_k(n_k)$ being selected. Further, F(t) in the last is a value giving time dependency of the inter-object interference. Therefore, when it is not necessary to give time dependency to the inter-track interference, F(t) is set to a constant value. On the other hand, when the time dependency is given to the inter-track interference, F(t) may be defined as a function whose value gradually decreases over time, as shown in FIG. 10, for example. When F(t) shown in FIG. 10 is employed, more recent collision is weighted heavier and focused.

After step S447, if the time t has not reached T (No in step S448), Loop4 is repeated. In this case, the value of t is incremented by Δt (step S449), and the process returns to step S445 to repeat Loop4. On the other hand, if the time t has reached T after step S447 (Yes in step S448), Loop4 is finished. If the own vehicle $O_1$ does not collide with the other vehicle $O_k$ at the time t, the process directly proceeds to a determination process to determine whether to repeat Loop4 or not (step S448).

Through the repeating processes of Loop4 as described above, the value of the degree of interference $r_1(n_1, k)$ becomes higher as the number of collisions increases. After Loop4 finishes, the determination process is performed in step S450 to determine whether to repeat Loop3 or not. Specifically, when the interference evaluation of any of the tracks generated for the other vehicle $O_k$ has not bee performed with respect to one track $P_1(n_1)$ of the own vehicle $O_1$ (No in step S450), $n_k$ is set to $n_k+1$ (step S451) and the process returns to step S443 to repeat Loop3.

On the other hand, when the interference evaluation has been performed on all the tracks generated for the other vehicle $O_k$ with respect to one track $P_1(n_1)$ of the own vehicle $O_1$ (Yes in step S450), it means that interference evaluation of one track $P_k(n_k)$ of the other vehicle $O_k$ has been finished. Therefore, a final degree of interference $r_1(n_1, k)$ which indicates the evaluation of interference between the track $P_1(n_1)$ of the own vehicle $O_1$ and all the tracks of the other vehicle $O_k$ is obtained (step S452), and the obtained value is output and stored in the storage unit 7 (step S453).

The value of the degree of interference $r_1(n_1, k)$ output in step S453 is dependent on the probability $p(P_k(n_k))$ of the selection of one track $p_k(n_k)$ from all the tracks of the other vehicle $O_k$. Hence, if $c_{1k}$ in the formula (5) is made independent of k and made constant (for example, $c_{1k}=1$), and F(t) is made constant (for example, 1), the degree of interference $r_1(n_1, k)$ is a sum of products of the probability $p(P_k(n_k))$ of each of the tracks $P_k(n_k)$ and the number of collisions between the track $P_k(n_k)$ and the track $P_1(n_1)$ of the own vehicle $O_1$ of all the elements of the set of tracks $\{P_k(n_k)\}$. This represents no other than the probability of collision between one track $P_1(n_1)$ of the own vehicle $O_1$ and the possible track of the other vehicle $O_k$. Therefore, the final value obtained as the degree of interference $r_1(n_1, k)$ is proportional to the probability of collision between one track $P_1(n_1)$ of the own vehicle $O_1$ and the other vehicle $O_k$.

Subsequent to step S453, a determination process is performed to determine whether to repeat Loop2 or not. If there still remains the other vehicle $O_k$ for which the interference evaluation should be performed with respect to the own vehicle $O_1$ (No in step S454), the value of k is incremented by one (step S455) and the process returns to step S442 to repeat Loop2. On the other hand, if there is none of the other vehicle $O_k$ for which the interference evaluation should be performed with respect to the own vehicle $O_1$ (Yes in step S454), the process proceeds to step S456.

In step S456, the degree of interference $r_1(n_1, k)$ obtained through Loop2 to Loop4 is weighted by weight $\alpha(k)(>0)$ depending on the other vehicle $O_k$. Then, a degree of total interference,

[Formula 6]

$$R_1(n_1) = \sum_{k=2}^{K} \alpha(k) r_1(n_1, k) \qquad (6)$$

is calculated as a total sum of the weighted degrees of interference, and the result of calculation is output and stored in the storage unit 7. The value of the weight $\alpha(k)$ may be set equal as a constant value (for example, 1), or may be set according to a degree of danger depending on conditions such as a type of the object $O_k$. As a result, the degree of total interference can be calculated for the track $P_1(n_1)$ of the own vehicle $O_1$ in the entire time-space environment including all the other vehicles $O_2, \ldots, O_k$.

Figure 11:
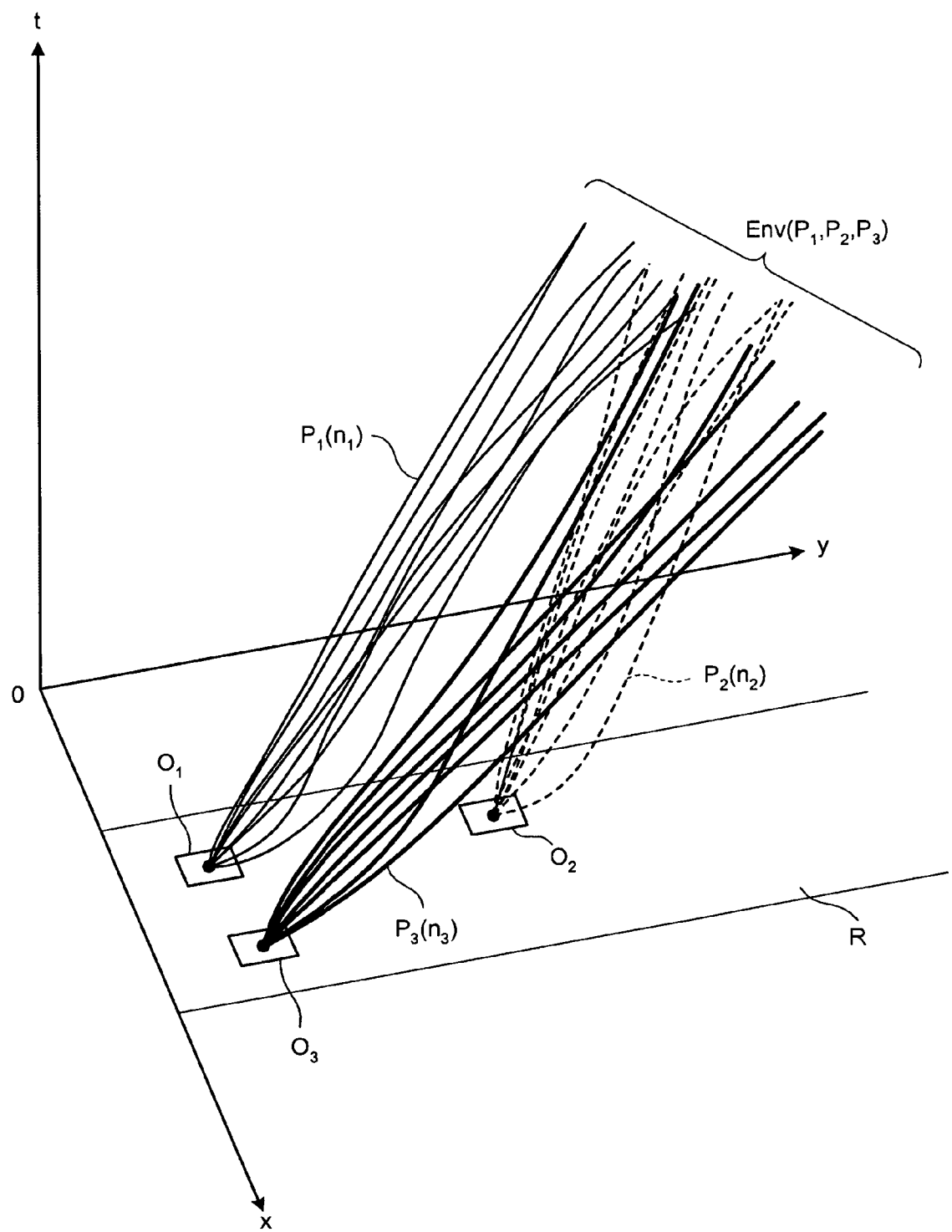
FIG. 11 is a schematic diagram of an example of interference evaluation based on a degree of total interference between an own vehicle and other vehicles in the time-space environment.

For example, when plural other vehicles are present within a predetermined range around the own vehicle $O_1$ as in a time-space environment $\text{Env}(P_1, P_2, P_3)$ shown in FIG. 11 (two other vehicles are shown in FIG. 11), it is more preferable to perform the interference evaluation based on the degree of total interference $R_1(n_1)$ in the time-space environment than to perform the interference evaluation based on respective degrees of interference $r_1(n_1, 2)$ and $r_1(n_1, 3)$ with respect to the other vehicles $O_2$ and $O_3$ because more appropriate danger avoidance can be realized.

The degree of total interference may be set as:

[Formula 7]

$$R_1(n_1) = \max_{k}(\alpha(k) r_1(n_1, k)).$$

In this case, a degree of danger of a most dangerous object $O_k$ is treated as the degree of total interference. According to this technique, when there is an interference with a small number of objects and no interference with a remaining large number of objects, the calculated degree of total interference would not become low, as a total, whereby it is possible to avoid making a determination of safety against an intuition of a person.

In subsequent step S457, a determination process is performed to determine whether to repeat Loop1 or not. Specifically, when there still remains a track for which the interference evaluation should be performed among the set of tracks $\{P_1(n_1)\}$ of the own vehicle $O_1$ (No in step S457), the value of $n_1$ is incremented by one (step S458) and the process returns to step S441 to repeat Loop1. On the other hand, when there is no track remaining for which the interference evaluation should be performed in the set of tracks $\{P_1(n_1)\}$ of the own vehicle $O_1$ (Yes in step S457), the Loop1 is finished and the interference degree calculation process ends.

The values of $c_{1k}$ and $F(t)$ used to increase the degree of interference $r_1(n_1, k)$ in step S447 are not always constant. For example, the coefficient $c_{1k}$ can be set to a magnitude of relative speed at the time of collision between the own vehicle $O_1$ and the other vehicle $O_k$. In general, the higher the magnitude of relative speed is, the larger the shock at the collision will be. Therefore, when the coefficient $c_{1k}$ is set to the magnitude of relative speed between the vehicles, a degree of shock at the collision of the vehicles can be reflected in the degree of interference $r_1(n_1, k)$.

Alternatively, a value indicating a seriousness of the damage can substitute for the coefficient $c_{1k}$. In this case, a correlation between the magnitude of relative speed between the vehicles at the time of collision and a damage scale evaluation value, which is a quantified evaluation of a damage scale, and/or an amount of financial damage may be found and stored in the storage unit 7, and the stored value may be read out from the storage unit 7 and assigned to the coefficient $c_{1k}$. When the sensor unit 3 has a function of detecting the type of objects, the damage scale evaluation value and/or an amount of financial damage may be determined according to the type of objects. In this case, it may be preferable if the possibility of collision with a person can be reduced as far as possible by, for example, setting an extremely large $c_{1k}$ value for the collision with a person in comparison with a collision with a vehicle.

When the own-vehicle-path efficiency evaluator 62 evaluates the driving efficiency based on the shortness of the time elapsed before the arrival at the destination, evaluation can be made based on a traveling distance y during an operation time interval $\Delta t$ (for example, 0.1 second or 0.5 second) on each of the predicted own-vehicle-path candidates, or a traveling distance y during a control time tmax (for example, 5 seconds). As the traveling distance y becomes longer, the efficiency evaluation value increases.

Returning to the process shown in FIG. 7, a safe path "safetypath" and an optimal path "bestpath" are each initialized to "non" (meaning there is no such path) (step S403). Variable i is set to one (step S404), and a safety evaluation value S(i) (corresponding to the degree of total interference in the description of FIG. 8) and an efficiency evaluation value E(i) of an $i_{th}$ own-vehicle-path candidate are calculated (step S405). Firstly, it is determined whether "safetypath" is "non" (none) or not (step S406). If "safetypath" is not, "non" (none), (No in step S406), it is determined whether the calculated safety evaluation value S(i) is smaller than a minimum value Smin of the safety evaluation value or not (step S407). When "safetypath" is "non" (none) (Yes in step S406), or when the safety evaluation value S(i) is smaller than the minimum value Smin (Yes in step S407), the minimum value Smin of the safety evaluation value is set to S(i) and "safetypath" is set to i (which indicates the $i_{th}$ own-vehicle-path candidate) (step S408).

Subsequently, it is determined whether the safety evaluation value S(i) satisfies safety condition by exceeding a predetermined value set in the predetermined value storage unit 71 (step S410). Here, "exceeding a predetermined value" means that the safety evaluation value indicates a value lower than the set predetermined value and thereby having a higher safety than that of the predetermined value (in other words, having a lower risk). When the safety evaluation value S(i) satisfies the safety condition by exceeding the predetermined value (Yes in Step S410), subsequently it is determined whether "bestpath" is "non" (none) or not (step S411). When "bestpath" is not "non" (none) (No in step S411), it is determined whether the calculated efficiency evaluation value E(i) is larger than a maximum value Emax of the efficiency evaluation value or not (step S412). When "bestpath" is "non" (none) (Yes in step S411) or when the efficiency evaluation value E(i) is larger than the maximum value Emax (Yes in step S412), the maximum value Emax of the efficiency evaluation value is set to E(i), and "bestpath" is set to i (which indicates the $i_{th}$ own-vehicle-path candidate) (step S413).

Then, the variable i is incremented by +1 (step S414) and the same processes are repeated for each of the all predicted own-vehicle-path candidates (step S415). When the processes are finished for all the own-vehicle-path candidates (Yes in step S415), and still "bestpath" is "non" and the optimal path cannot be found, "safetypath" found in step S408 is set as "bestpath" (step S416). Then, operation information of the optimal path "bestpath"=i found in step S413 or step S416 is output to the side of the output terminal 9 (step S417). In other words, the $i_{th}$ own-vehicle-path candidate is selected as the drivable path of the own vehicle and information concerning x(t) and u(t) corresponding to the $i_{th}$ own-vehicle-path candidate (track) is output to the side of the output terminal 9.

When the drivable path of the own vehicle is selected with the priority on the safety, the own-vehicle-path candidate which is "safetypath"=i whose safety evaluation value S(i) is the minimum value Smin may well be selected. In the present embodiment, however, in consideration of a predetermined value which is optionally set within the range satisfying the safety standard, plural own-vehicle-path candidates which satisfy the safety condition by exceeding the predetermined value are regarded as equal in terms of safety, and the own-vehicle-path candidate which is "bestpath"=i whose efficiency evaluation value is the maximum efficiency evaluation value Emax among the above own-vehicle-path candidates is selected. Thus, for example, even though the safety may be slightly lowered within the range satisfying the safety standard (as the driver accepts driving risk by his/her own decision), the selection of a passing path can be accepted so that the own vehicle can arrive the destination faster, whereby realistic determination of the own-vehicle path harmonizing the safety and the driving efficiency can be realized.

When an actuator unit which corresponds to the output terminal 9 is a steering, an accelerator, or a brake itself that is directly driven by an electric control system serving for the automatic driving, the operation of the steering, the accelerator, or the brake can be performed directly using an operation signal (corresponding to x(t) and u(t) of the selected track) output from the setting-based most-efficient path selector 63. On the other hand, when the actuator unit which corresponds to the output terminal 9 is an actuator which operates the steering, an accelerator pedal, or a brake pedal (corresponding to legs and hands of the driver), an operation torque is calculated based on an operation signal (corresponding to x(t) and u(t) of the selected track) output from the setting-based most-efficient path selector 63, and the calculated torque may be applied to the steering, the accelerator, or the brake for the operation. Particularly in this case, since the automatic operation can be overridden by an operation by a person, the apparatus can be applied not only for the automatic driving but also for a driving operation supporting apparatus.

Next, setting of a predetermined value for defining an acceptable level of the safety evaluation value will be described. For example, the predetermined value input unit 8 may be an accelerator pedal, and the predetermined value may be made variably set in such a manner that the predetermined value increases from an initially-set value according to a tread amount of the accelerator pedal by the driver. The driver knows that the driving risk related with the driving of the own vehicle increases as the tread amount of the accelerator pedal increases from a current driving state. Hence, the increased tread amount can be regarded as a manifestation of the driver's will to prioritize the driving efficiency (in other words, to arrive the destination faster). Thus, the variable setting of the predetermined value (increasing the driving risk) linked with the tread amount of the accelerator pedal can be regarded as a realistic measure.

Similarly, the predetermined value input unit 8 can be a brake pedal, and the predetermined value may be variably set in such a manner that the predetermined value decreases from an initially-set value or from a current set value according to a tread amount of the brake pedal by the driver. The increased tread amount of the brake pedal from the current driving state can be regarded as a manifestation of the driver's will to avoid the driving risk of the driving of the own-vehicle as much as possible. Thus, the variable setting of the predetermined value (lowering the driving risk) linked with the tread amount of the brake pedal can also be regarded as a realistic measure.

Further, when the predetermined value input unit 8 is a mode-selecting switch (or levers) related with the driving mode, and the driving mode includes a luxury mode and a sport mode, the predetermined value may be variably set in such a manner that the predetermined value increases from an initially-set value according to an operation by the driver to select the sport mode. Since the driver knows that the driving risk in the driving of the own vehicle increases by the selection of the sport mode, such selection can be regarded as a manifestation of driver's will to prioritize the driving efficiency by speeding up (in other words, to arrive the destination faster). Thus, the variable setting of the predetermined value linked with the selecting operation of the mode-selecting switch can be regarded as a realistic measure.

Further, an upper limit of the predetermined variable value which defines the acceptable level of the safety evaluation value can be set by an auto insurance company to a fixed value in an unchangeable state in accordance with an amount of premium of insurance. Specifically, the upper limit which defines the variable range of the predetermined value which can be varied through the operation of the accelerator pedal and the like may be fixedly set in advance according to the insurance contract between the insurance company and an individual driver. The insurance company may make an insurance contract with an individual driver of the own vehicle at a premium amount corresponding to the value of the upper limit. The upper limit defines the acceptable range of a degree of danger. When the upper limit the driver accepts is high, the driving risk is also high. Hence, the premium of the insurance is high. On the other hand, when the upper limit the driver accepts is low, the driving risk is also low, and hence, the premium of the insurance can be low. Thus, a suitable insurance contract can be made in view of the driving risk and the driving efficiency.

In the present embodiment, the safety evaluation value which indicates the evaluation of the safety of the own vehicle is used as a first evaluation value, and the efficiency evaluation value which indicates the evaluation of the driving efficiency of the own vehicle is used as a second evaluation value. The first and the second evaluation values, however, can be evaluation values other than the safety evaluation value and the efficiency evaluation value. Further, when the own-vehicle-path candidate is selected based on the second evaluation value, it is not necessary that a selected own-vehicle-path candidate has a maximum second evaluation value, instead an own-vehicle-path candidate with a second highest second evaluation value, or a third highest second evaluation value may be selected. In brief, any of the own-vehicle-path candidates can be selected as far as the second evaluation value of the selected own-vehicle-path candidate is not lowest. Hence, when an own-vehicle path is determined from plural own-vehicle-path candidates, it is possible to first select own-vehicle-path candidates with high first evaluation values, then select own-vehicle-path candidates with high second evaluation values as appropriate own-vehicle-path candidates from the selected own-vehicle-path candidates, and select any one of the appropriate own-vehicle-path candidates.

INDUSTRIAL APPLICABILITY

As can be seen from the foregoing, the own-vehicle-path determining method and the own-vehicle-path determining apparatus according to the present invention are useful for determining one of plural predicted own-vehicle-path candidates as an optimal drivable path, and more particularly are suitable for realizing automatic driving of an own vehicle.

The invention claimed is:

1. An own-vehicle-path determining method comprising:
detecting a position and an internal condition of an object, including other vehicles present within a predetermined surrounding range, by a sensor unit mounted on an own vehicle;
generating a track representing a possible positional change of at least two objects based on the detected results within a predetermined time in a time-space configured with time and space, the at least two objects including at least the own vehicle and one of the other vehicles;
predicting a path of the at least two objects using the generated track;
calculating a first evaluation value of each of plural predicted own-vehicle-path candidates, the first evaluation value indicating an evaluation of safety of the own vehicle obtained by calculating a possibility of interference such as collision between the other vehicle and each of the plural predicted own-vehicle-path candidates;
calculating a second evaluation value of each of the plural predicted own-vehicle-path candidates, the second evaluation value indicating an evaluation of driving efficiency of the own vehicle;
first selecting own-vehicle-path candidates with high first evaluation values from the plural predicted own-vehicle-path candidates;
second selecting own-vehicle-path candidates with high second evaluation values as appropriate own-vehicle-path candidates from the first selected own-vehicle-path candidates; and
selecting any one of the appropriate own-vehicle-path candidates as an own-vehicle path.

2. The own-vehicle-path determining method according to claim 1, wherein own-vehicle-path candidates with the first evaluation values higher than a predetermined value are selected in the first selecting own-vehicle-path candidates with high first evaluation values from the plural predicted own-vehicle-path candidates.

3. The own-vehicle-path determining method according to claim 1, wherein
own-vehicle-path candidates with the second evaluation value higher than a predetermined value are selected in the second selecting own-vehicle-path candidates with high second evaluation values from the first selected own-vehicle-path candidates.

4. The own-vehicle-path determining method according to claim 2, further comprising inputting and setting the predetermined value.

5. The own-vehicle-path determining method according to claim 4, wherein the predetermined value is set variably in the inputting and setting the predetermined value.

6. The own-vehicle-path determining method according to claim 5, wherein the predetermined value is set variably so as to increase according to a travel amount of an accelerator pedal in the inputting and setting the predetermined value.

7. The own-vehicle-path determining method according to claim 5, wherein the predetermined value is set variably so as to decrease according to a travel amount of a brake pedal in the inputting and setting the predetermined value.

8. The own-vehicle-path determining method according to claim 5, wherein the predetermined value is set variably according to an operation of a mode-selecting switch related with a driving mode in the inputting and setting the predetermined value.

9. An own-vehicle-path determining method comprising:
detecting a position and an internal condition of an object, including other vehicles present within a predetermined surrounding range, by a sensor unit mounted on an own vehicle;
generating a track representing a possible positional change of at least two objects based on the detected results within a predetermined time in a time-space configured with time and space, the at least two objects including at least the own vehicle and one of the other vehicles;
predicting a path of the at least two objects using the generated track;
calculating a first evaluation value of each of plural predicted own-vehicle-path candidates, the first evaluation value indicating an evaluation of safety of the own vehicle obtained by calculating a possibility of interference such as collision between the other vehicle and each of the plural predicted own-vehicle-path candidates;
calculating a second evaluation value of each of the plural predicted own-vehicle-path candidates, the second evaluation value indicating an evaluation of driving efficiency of the own vehicle;
first selecting own-vehicle-path candidates with high first evaluation values from the plural predicted own-vehicle-path candidates; and
second selecting an own-vehicle-path candidate with a highest second evaluation value as a drivable path of an own vehicle from the first selected own-vehicle-path candidates.

10. The own-vehicle-path determining method according to claim 9, wherein
own-vehicle-path candidates with the first evaluation values higher than a predetermined value are selected in the first selecting own-vehicle-path candidates with high first evaluation values from the plural predicted own-vehicle-path candidates.

11. The own-vehicle-path determining method according to claim 10, further comprising inputting and setting the predetermined value.

12. The own-vehicle-path determining method according to claim 11, wherein the predetermined value is set variably in the inputting and setting the predetermined value.

13. The own-vehicle-path determining method according to claim 12, wherein the predetermined value is set variably to increase according to a travel amount of an accelerator pedal in the inputting and setting the predetermined value.

14. The own-vehicle-path determining method according to claim 12, wherein the predetermined value is set variably to decrease according to a travel amount of a brake pedal in the inputting and setting the predetermined value.

15. The own-vehicle-path determining method according to claim 12, wherein the predetermined value is set variably according to an operation of a mode-selecting switch related with a driving mode in the inputting and setting the predetermined value.

16. An own-vehicle-path determining apparatus comprising:
a detecting unit configured to detect a position and an internal condition of an object, including other vehicles present within a predetermined surrounding range, by a sensor unit mounted on an own vehicle;
a track generator that generates a track representing a possible positional change of at least two objects based on detected results of the detecting unit within a predetermined time in a time-space configured with time and space, the at least two objects including at least the own vehicle and one of the other vehicles;
a predicting unit that predicts a path of the at least two objects using the generated track;
a first calculator that calculates a first evaluation value of each of plural predicted own-vehicle-path candidates, the first evaluation value indicating an evaluation of safety of the own vehicle; obtained by calculating a possibility of interference such as collision between the other vehicle and each of the plural predicted own-vehicle-path candidates;
a second calculator that calculates a second evaluation value of each of the plural predicted own-vehicle-path candidates, the second evaluation value indicating an evaluation of driving efficiency of the own vehicle; and
a selector that first selects own-vehicle-path candidates with high first evaluation values from the plural predicted own-vehicle-path candidates, second selects own-vehicle-path candidates with high second evaluation values as appropriate own-vehicle-path candidates from the first selected own-vehicle-path candidates, and third selects any one of the appropriate own-vehicle-path candidates as an own-vehicle path.

17. The own-vehicle-path determining apparatus according to claim 16, wherein the selector selects, when selecting the own-vehicle-path candidates with high first evaluation values from the plural predicted own-vehicle-path candidates, own-vehicle-path candidates with the first evaluation values higher than a predetermined value.

18. The own-vehicle-path determining apparatus according to claim 16, wherein the selector selects, when second selecting the own-vehicle-path candidates with high second evaluation values from the first selected own-vehicle-path candidates, own-vehicle-path candidates with the second evaluation values higher than a predetermined value.

19. The own-vehicle-path determining apparatus according to claim 17, further comprising a predetermined value input unit that inputs and sets the predetermined value.

20. The own-vehicle-path determining apparatus according to claim 19, wherein the predetermined value input unit sets the predetermined value variably.

21. The own-vehicle-path determining apparatus according to claim 20, wherein the predetermined value input unit sets the predetermined value variably so that the predetermined value increases according to a travel amount of an accelerator pedal.

22. The own-vehicle-path determining apparatus according to claim 20, wherein the predetermined value input unit sets the predetermined value variably so that the predetermined value decreases according to a travel amount of a brake pedal.

23. The own-vehicle-path determining apparatus according to claim 20, wherein the predetermined value input unit sets the predetermined value variably according to an operation of a mode-selecting switch related with a driving mode.

24. An own-vehicle-path determining apparatus comprising:
a detecting unit configured to detect a position and an internal condition of an object, including other vehicles present within a predetermined surrounding range, by a sensor unit mounted on an own vehicle;
a track generator that generates a track representing a possible positional change of at least two objects based on detected results of the detecting unit within a predetermined time in a time-space configured with time and space, the at least two objects including at least the own vehicle and one of the other vehicles;
a predicting unit that predicts a path of the at least two objects using the generated track;
a first calculator that calculates a first evaluation value of each of plural predicted own-vehicle-path candidates, the first evaluation value indicating an evaluation of safety of the own vehicle obtained by calculating a possibility of interference such as collision between the other vehicle and each of the plural predicted own-vehicle-path candidates;
a second calculator that calculates a second evaluation value of each of the plural predicted own-vehicle-path candidates, the second evaluation value indicating an evaluation of driving efficiency of the own vehicle; and
a selector that first selects own-vehicle-path candidates with high first evaluation values from the plural predicted own-vehicle-path candidates, and second selects an own-vehicle-path candidate with a highest second evaluation value as a drivable path of the own vehicle from the first selected own-vehicle-path candidates.

25. The own-vehicle-path determining apparatus according to claim 24, wherein the selector selects, when selecting the own-vehicle-path candidates with high first evaluation values from the plural predicted own-vehicle-path candidates, own-vehicle-path candidates with the first evaluation values higher than a predetermined value.

26. The own-vehicle-path determining apparatus according to claim 25, further comprising a predetermined value input unit that inputs and sets the predetermined value.

27. The own-vehicle-path determining apparatus according to claim 26, wherein the predetermined value input unit sets the predetermined value variably.

28. The own-vehicle-path determining apparatus according to claim 27, wherein the predetermined value input unit sets the predetermined value variably so that the predetermined value increases according to a travel amount of an accelerator pedal.

29. The own-vehicle-path determining apparatus according to claim 27, wherein the predetermined value input unit sets the predetermined value variably so that the predetermined value decreases according to a travel amount of a brake pedal.

30. The own-vehicle-path determining apparatus according to claim 27, wherein the predetermined value input unit sets the predetermined value variably according to an operation of a mode-selecting switch related with a driving mode.

* * * * *